United States Patent
Miser et al.

(10) Patent No.: US 8,118,035 B2
(45) Date of Patent: Feb. 21, 2012

(54) SUPPORTS CATALYST FOR THE COMBUSTION OF CARBON MONOXIDE FORMED DURING SMOKING

(75) Inventors: Donald Miser, Chesterfield, VA (US); Diane Gee, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 782 days.

(21) Appl. No.: 11/636,589

(22) Filed: Dec. 11, 2006

(65) Prior Publication Data

US 2007/0163612 A1 Jul. 19, 2007

Related U.S. Application Data

(60) Provisional application No. 60/749,593, filed on Dec. 13, 2005.

(51) Int. Cl.
*A24D 1/00* (2006.01)
(52) U.S. Cl. ........ 131/364; 131/334; 131/331; 423/608; 423/609
(58) Field of Classification Search .................. None
See application file for complete search history.

(56) References Cited

U.S. PATENT DOCUMENTS

| | | | |
|---|---|---|---|
| 4,140,654 A | 2/1979 | Yoshioka et al. | |
| 4,188,365 A | 2/1980 | Yoshioka et al. | |
| 4,868,150 A | 9/1989 | Spooner et al. | |
| 4,966,171 A | 10/1990 | Serrano et al. | |
| 5,084,144 A | 1/1992 | Reddy et al. | |
| 5,143,098 A | 9/1992 | Rogers et al. | |
| 5,173,215 A * | 12/1992 | Clarke | 423/608 |
| 5,240,014 A | 8/1993 | Deevi et al. | |
| 5,322,075 A | 6/1994 | Deevi et al. | |
| 5,591,368 A | 1/1997 | Fleischhauer et al. | |
| 5,864,051 A | 1/1999 | Iwasawa et al. | |
| 5,934,289 A | 8/1999 | Watkins et al. | |
| 5,944,025 A | 8/1999 | Cook et al. | |
| 6,053,176 A | 4/2000 | Adams et al. | |
| 6,299,778 B1 | 10/2001 | Penth et al. | |
| 6,340,379 B1 | 1/2002 | Penth et al. | |
| 6,395,244 B1 | 5/2002 | Hartweg et al. | |
| 2003/0000538 A1 * | 1/2003 | Bereman | 131/352 |
| 2003/0073573 A1 * | 4/2003 | Baker et al. | 502/180 |
| 2004/0197627 A1 | 10/2004 | Yan et al. | |
| 2004/0250826 A1 * | 12/2004 | Li et al. | 131/364 |
| 2004/0250827 A1 * | 12/2004 | Deevi et al. | 131/364 |

FOREIGN PATENT DOCUMENTS

| WO | WO 2004/041008 A | 5/2004 |
|---|---|---|
| WO | WO 2005/039328 A | 5/2005 |
| WO | WO 2005044723 A2 * | 5/2005 |

OTHER PUBLICATIONS

Marshall, The Electrical Conductivity of Titanium Dioxide, 1942, 61, 56-62.*

(Continued)

*Primary Examiner* — Richard Crispino
*Assistant Examiner* — Phu Nguyen
(74) *Attorney, Agent, or Firm* — Buchanan Ingersoll & Rooney PC

(57) ABSTRACT

Supported catalyst particles, which can be incorporated in the tobacco cut filler, cigarette wrapper and/or cigarette filter of a cigarette, are useful for low-temperature and near-ambient temperature catalysis of carbon monoxide and/or nitric oxide. The supported catalyst comprises catalyst particles that are supported on particles of an electrically conductive support selected from the group consisting of graphitic carbon and a partially reduced oxide.

12 Claims, 2 Drawing Sheets

OTHER PUBLICATIONS

Richard R. Baker, "Mechanism of Smoke Formation and Delivery," Recent Advances in Tobacco Science, 1980, pp. 184-224, vol. 6.

Richard R. Baker, "Variation of the Gas Formation Regions within a Cigarette Combustion Coal During the Smoking Cycle," Beiträge zur Tabakforschung International, Mar. 1981, pp. 1-17, vol. 11, No. 1.

Sten Andersson et al., "A Homologous Series of Mixed Titanium Chromium Oxides $Ti_{n-2}CR_2O_{2n-1}$ Isomorphous with the Series $Ti_nO_{2n-1}$ and $V_nO_{2n-1}$," ACTA Chemica Scandinavica, 1959, pp. 989-997, vol. 13.

Marquez-Alvarez C. et al., "Removal of NO over carbon supported copper catalysts: II. Evaluation of catalytic properties under different reaction conditions", Carbon, Elsevier, Oxford, GB, vol. 34, No. 12, 1996, pp. 1509-1514.

International Search Report and Written Opinion dated Sep. 11, 2007 for PCT/IB2006/004109.

* cited by examiner

SUPPORTS CATALYST FOR THE COMBUSTION OF CARBON MONOXIDE FORMED DURING SMOKING

CROSS-REFERENCE TO RELATED APPLICATION

This application claims priority under 35 U.S.C. §119(e) to U.S. provisional Application No. 60/749,593, filed on Dec. 13, 2005, the entire content of which is incorporated herein by reference.

BACKGROUND

Cigarettes produce both mainstream smoke during a puff and sidestream smoke during static burning. Constituents of both mainstream smoke and sidestream smoke are carbon monoxide (CO) and nitric oxide (NO). The reduction of the amount of carbon monoxide and/or nitric oxide in smoke is desirable.

SUMMARY

A preferred embodiment of a component of a cigarette comprises particles of a supported catalyst, wherein the supported catalyst comprises catalyst particles supported in and/or on electrically conductive support particles of graphitic carbon or a partially reduced oxide. The component is selected from the group consisting of tobacco cut filler, cigarette paper and cigarette filter material.

A preferred embodiment of a cigarette comprises a tobacco rod, cigarette paper and an optional filter. At least one of the tobacco rod, cigarette paper and optional filter comprises supported catalyst particles for the conversion of carbon monoxide to carbon dioxide and/or nitric oxide to nitrogen. The supported catalyst particles comprise catalyst particles supported in and/or on electrically conductive support particles selected from the group consisting of graphitic carbon and a partially reduced oxide.

Also disclosed is a preferred method of making a cigarette comprising incorporating supported catalyst particles in and/or on at least one of tobacco cut filler, a cigarette wrapper optionally comprising web-filler material and a cigarette filter comprising filter material; forming a tobacco column from the tobacco cut filler in a cigarette making machine; and placing the cigarette wrapper around the tobacco column to form a tobacco rod of a cigarette; and optionally attaching the cigarette filter to the tobacco column using tipping paper.

DETAILED DESCRIPTION OF PREFERRED EMBODIMENTS

Figure 1:
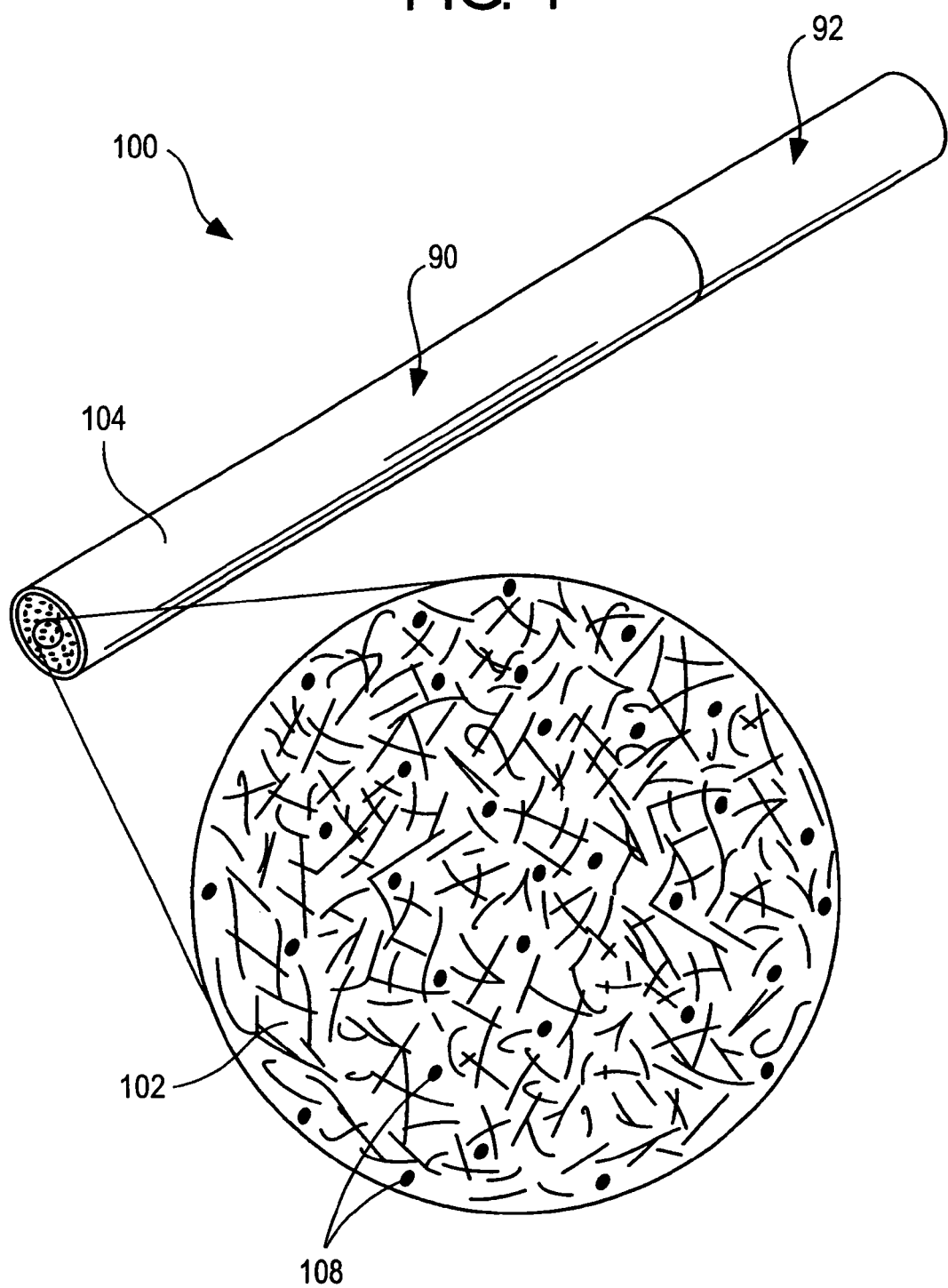
FIG. 1 shows an exemplary smoking article having supported catalyst particles supported on tobacco cut filler with a magnified view of the tobacco cut filler.

Disclosed are particles of a supported catalyst that can be incorporated into a component of a cigarette. The supported catalyst particles, which comprise catalyst particles that are incorporated in and/or on particles of an electrically conductive support, can be incorporated into one or more components of a cigarette such as tobacco cut filler, cigarette paper and/or cigarette filter material. In a preferred embodiment, the supported catalyst particles are incorporated in an amount effective to convert carbon monoxide to carbon dioxide and/or convert nitric oxide to nitrogen during smoking of the cigarette. Exemplary support particles comprise graphitic carbon or at least one partially-reduced oxide. The supported catalyst is useful for low-temperature or near-ambient temperature catalysis of carbon monoxide and/or nitric oxide. By incorporating the supported catalyst into a component of a cigarette, the amount of carbon monoxide and/or nitric oxide in mainstream smoke can be reduced.

The supported catalyst particles may also reduce the concentration in mainstream smoke of at least one polyaromatic hydrocarbon compound. For example, the supported catalyst particles may reduce the concentration in mainstream smoke of at least one of naphthalene, acenaphthene, fluorene, phenanthrene, anthracene, fluoranthrene, pyrene, benz(a)anthracene, chrysene, benzo(b)fluoranthrene, benzo(k)fluoranthrene, benzo(a)pyrene, indeno[1,2,3-cd]pyrene, dibenz[a,h]anthracene and benzo[g,h,i]perylene.

Particles of the catalyst and particles of the support preferably have low aspect ratio shapes such as spheres. However, these particles may also include higher aspect ratio shapes, such as fibers. The particles of the catalyst and/or the particles of the substrate may have an aspect ratio of about 1 (e.g., spheres) or greater than 1 (e.g., whiskers or fibers) where the "aspect ratio" is defined as the ratio of length to diameter of a particle.

The catalyst particles can comprise particles of a metal or a metal oxide. For example, the catalyst particles can comprise particles of a noble metal or a noble metal oxide. The catalyst particles can comprise nanoscale particles. By "nanoscale" is meant that the particles have an average particle diameter of less than a micron (e.g., less than about 100 nm, more preferably less than about 50 nm, and most preferably less than about 10 nm).

Preferred catalyst particles are iron oxide particles. Nonporous nanoscale iron oxide particles are marketed by MACH I, Inc., King of Prussia, Pa. under the trade names NANOCAT® Superfine Iron Oxide (SFIO) and NANOCAT® Magnetic Iron Oxide. The NANOCAT® Superfine Iron Oxide is amorphous ferric oxide in the form of a free flowing powder, with a particle size of about 3 nm, a specific surface area of about 250 $m^2/g$, and a bulk density of about 0.05 $g/cm^3$. The NANOCAT® Superfine Iron Oxide is synthesized by a vapor-phase process, which renders it substantially free of impurities, and is suitable for use in food, drugs, and cosmetics. The NANOCAT® Magnetic Iron Oxide is a free flowing powder with a particle size of about 25 nm and a surface area of about 40 $m^2/g$. The support particles can comprise one or more metal oxides.

The support particles are electrically conductive. The support particles preferably enhance the catalytic, oxidative and/or reducing properties of the catalyst particles. The support particles themselves may have catalytic activity. In a first embodiment, the support particles comprise graphitic carbon. In a second embodiment, the support particles comprise particles of at least one partially-reduced metal oxide.

Preferred support particles comprise graphitic carbon nanostructures, such as graphite nanotubes or graphite nanofibers. Graphite nanotubes and graphite nanofibers are comprised of graphite sheets that are aligned in a direction ranging from substantially perpendicular to substantially parallel to the longitudinal (or growth) axis of the nanostructure. Graphite nanotubes and nanofibers can also have a diameter from about 0.5 nm to 1,000 nm, preferably from about 1 to 500 nm. Graphitic substrates preferably have a surface area of from about 1 to 4,000 m²/g, more preferably from about 100 to 1000 m²/g, and a crystallinity of from about 50% to 100%, more preferably from about 90% to 100%.

Graphite support particles can be obtained commercially or formed by any suitable process. Supported catalyst particles may be formed by combining commercially available graphite support particles with catalyst particles or with a precursor compound that can be processed (e.g., thermally decomposed) to form catalyst particles.

Commercially available graphite nanotubes, for example, typically comprise incorporated therein metallic catalyst particles such as cobalt particles or nickel particles. A catalyst such as cobalt or nickel is typically used during the manufacture of the graphite nanotubes, and metallic particles of the catalyst can remain incorporated in the graphite nanotubes after they are formed. Even though the catalyst particles are enveloped by the graphite (i.e., the metallic catalyst particles are typically not exposed to a gas stream passing over the graphite nanotubes), the catalytic activity of graphite nanotubes can be enhanced with respect to graphite nanotubes that are free of catalyst particles. An electron transfer mechanism between the catalyst particles and the graphite substrate can explain the catalytic enhancement.

In a further method, graphitic support particles can be prepared via melt-, dry- or wet-spinning of one or more suitable carbon precursors such as (poly)acrylonitrile, petroleum pitch, phenolic resins or other suitable polymers. In a preferred method, electrospinning can be used to synthesize graphitic support particles. In electrospinning, an electrostatic force is used to eject a continuous charged jet of a polymer solution (or melt) through an orifice. Graphitic fibers can be formed via curing and pyrolysis of green fibers formed from the ejected solution. Electrospinning can be used to prepare fibrous graphitic particles having a diameter ranging from several nanometers to several microns.

An electrospinning apparatus can comprise means such as a syringe pump for metering a polymeric solution at a desired liquid flow rate. A voltage can be applied to the output orifice of the syringe pump. The apparatus can further comprise a grounded target, which is preferably adapted to rotate and/or translate with respect to the output orifice of the syringe pump. A fixed distance can be maintained between the output of the syringe pump and the target.

By way of example, substrate particles comprising graphite nanotubes and graphite nanofibers can be prepared by electrospinning polymer solutions. A first exemplary polymer solution comprises a 50 wt. %/wt. % solution of Novolak phenolic resin dissolved in ethanol. A second exemplary polymer solution comprises a 50 wt. %/wt. % solution of Resole phenolic resin dissolved in ethanol. Suitable polymer solutions may have a concentration greater than or less than 50 wt. % (e.g., about 10, 20, 30, 40, 50, 60, 70, 80 or 90±5 wt. %, but preferably in the range of about 35 to 55 wt. %). Graphite fibers can be formed from a polymer solution comprising a single resin or a mixture of resins. Furthermore, the polymer solution can further comprise an additive such as catalyst particles or one or more precursors thereof. Novolak and Resole phenolic resins are commercially available from Durez Corporation, Addison, Tex.

The volumetric flow rate of a resin solution can be from about 0.1-50 ml/hr, preferably from about 5 to 20 ml/hr; the voltage applied to the output of the device for metering the resin solution can be from about 1 to 50 keV, preferably from about 10 to 20 keV; and the distance between the output of the metering device and the target can be from about 5 to 50 cm, preferably from about 10 to 20 cm. Green fibers can be cured at a first temperature (e.g., between about 100° C. and 200° C.) and pyrolyzed to form graphite at a second temperature greater than the first temperature (e.g., between about 300° C. and 2000° C.).

For fibers spun from ethanol solutions of the Novolak and Resole phenolic resins, a preferred curing temperature is about 160° C., and a preferred pyrolysis temperature is between about 1600° C. and 2000° C. Fibers are preferably cured and pyrolyzed in an inert (e.g., non-oxidizing) atmosphere. For example, spun fibers can be cured and/or pyrolyzed in a vacuum furnace in an atmosphere of flowing argon or nitrogen.

Generally, the porosity of pyrolyzed graphite fibers decreases with increasing pyrolysis temperature. Furthermore, fibers pyrolyzed at higher temperatures typically display a more ordered crystallographic alignment of graphite sheets than fibers pyrolyzed at lower temperatures. The surface area of electrospun fibers pyrolyzed at a temperature of between about 400° C. and 1600° C. is between about 250 and 650 m²/g, while the surface area of electrospun fibers pyrolyzed at a temperature of between about 1600° C. and 2000° C. is less than about 30 m²/g.

Catalyst particles can be incorporated in electrospun graphite fibers by incorporating catalyst particles or a catalyst precursor into the resin that is spun. In a first example, catalyst particles (e.g., nanoscale iron oxide particles) can be incorporated into the resin. In a second example, a catalyst precursor (e.g., a copper, cobalt or platinum precursor) can be incorporated into the resin solution. According to the second example, during curing and/or pyrolysis of the green fibers to form graphite fibers, catalyst particles can form in situ via thermal decomposition of the catalyst precursor. Incorporation of a metal, metal oxide or precursor compound into the resin solution used for electrospinning may promote formation of graphite at lower pyrolysis temperatures than resin solutions that are metal, metal oxide or precursor compound free.

According to another preferred embodiment, the support particles can comprise a partially-reduced metal oxide. The partially-reduced metal oxide preferably comprises a Magnéli phase (i.e., substoichiometric oxide) of titanium, vanadium, chromium, zirconium, niobium, molybdenum, hafnium or tantalum. Optionally, the sub-stoichiometric oxide can be doped. The dopant, which is different than the metal constituting the metal oxide, can be titanium, vanadium, chromium, zirconium, niobium, molybdenum, hafnium or tantalum.

Without wishing to be bound by any particular theory, it is believed that the addition of a dopant can stabilize the sub-oxide. A preferred dopant that can be added to titanium oxide-based support particles is, for example, niobium. The dopant addition can stabilize the sub-oxide (e.g., inhibit re-oxidation of the partially reduced oxide). Dopant-free sub-oxides (e.g., $Ti_4O_7$) more readily re-oxidize than doped sub-oxide phases. The catalytic efficiency of supported catalyst particles comprising re-oxidized support particles (i.e., $TiO_2$) is less than the catalytic efficiency of supported catalyst particles comprising a substoichiometric oxide support.

Substoichiometric oxides (e.g., Magnéli phases) can be represented by the chemical formula(s) $M_nO_{2n-1}$, or $M_nO_{3n-1}$, ($4 \leq n \leq 20$), where M is a transition metal. M is preferably one of Ti, V, Cr, Zr, Nb, Mo, Hf and Ta. Magnéli phases have a crystallographic structure similar to, but distinguishable from, the rutile structure of triclinic titanium dioxide. Magnéli phases are substoichiometric, that is, they are oxygen deficient with respect to the valence requirements of stoichiometric metal oxides having the rutile structure (e.g., $TiO_2$). To accommodate the oxygen deficiency, Magnéli phases comprise a lattice distortion. Magnéli phases comprise two or more two-dimensional arrays of $MO_2$ octrahedra that are spaced apart by shear planes having the stoichiometry MO. The localized shear planes can provide a conductive pathway for the transfer of electrons. The most conductive Magnéli structure is the most reduced phase ($M_4O_7$), which has the highest density of shear planes.

Magnéli phase titanium sub-oxide materials are disclosed in Magnéli, *A. Acta Chem. Scand.*, 13, 989 (1959), the entire content of which is hereby incorporated by reference.

Magnéli phase sub-oxides can be prepared by heating stoichiometric oxides at a temperature in excess of about 1000° C. in a reducing atmosphere. For example, support particles of titanium oxide (e.g., $Ti_4O_7$) can be prepared by heating commercially available powders of titania ($TiO_2$) at about 1200° C. for up to about 2 weeks (e.g., from about 1, 2 or 3 hours to about 200 or 500 hours) in flowing hydrogen, nitrogen, argon or mixtures thereof. An exemplary gas flow rate is about 1 liter/min., though lower or higher gas flow rates can be used.

The support particles, which can be nanoscale particles or larger (e.g., micron-sized) particles, preferably have an average particle size of less than about 10 microns, though more preferred support particles have an average particle size of less than about 1 micron (e.g., less than about 0.5 micron or less than about 0.1 micron).

The support particles (i.e., graphite particles or sub-oxide particles) can comprise porous or non-porous particles. Pores with diameters less than about 20 nm are commonly known as micropores. Pores with diameters between about 20 and 500 nm are known as mesopores, and pores with diameters greater than about 500 nm are defined as macropores. The catalyst particles can be supported on an external surface of the support particles or within the channels and pores of porous support particles such as carbon nanotubes. The catalyst particles can be completely enveloped by the matrix of the support particles.

The support particles can act as a separator, which can inhibit diffusion, agglomeration or sintering together of the supported catalyst particles before or during combustion of the cut filler and/or cigarette paper during smoking. Because a support can minimize sintering of the catalyst particles, it can minimize the loss of their active surface area. The catalyst particles can be chemically or physically bonded to the support particles.

The support particles are preferably characterized by a BET surface area greater than about 20 $m^2/g$, e.g., from about 50 $m^2/g$ to 2,500 $m^2/g$, optionally with pores having a pore size greater than about 3 Angstroms, e.g., from about 10 Angstroms to 10 microns.

By "incorporated in" is meant that the catalyst particles are dispersed at least partially throughout the matrix of the support particles. By "incorporated on" is meant that the catalyst particles are dispersed on at least a portion of an exposed surface of the support particles.

Preferred supported catalyst particles comprise nanoscale catalyst particles supported on particles of graphitic carbon or a partially-reduced oxide.

The sub-oxides of titanium, vanadium, chromium, zirconium, niobium, molybdenum, hafnium and tantalum can act both as a support in synergy with the catalyst particles and as an active metal oxide oxidation catalyst. Equilibrium between different oxidation states of the principal metal (e.g., $Ti^{2+}$ and $Ti^{4+}$) can result in an exceptionally high oxygen storage and release capacity that enables catalytic combustion of CO by providing oxygen directly to catalytically active sites.

Catalyst particles can be incorporated in the support particles by various methods such as by physically admixing the catalyst particles with the support particles and/or via chemical routes such as by forming the catalyst particles in situ.

In one method, substantially dry catalyst particles can be physically admixed with support particles and the mixture can be agitated to incorporate the catalyst particles in and/or on the support particles. The catalyst particles can be chemically or physically bonded to an exposed surface of support particles (e.g., an external surface and/or a surface within a pore of cavity).

In a further method, catalyst particles may be dispersed in a liquid, and support particles may be mixed with the liquid having the dispersed catalyst particles. Catalyst particles dispersed in a liquid can be combined with support particles using techniques such as spraying or immersion.

After combining the support particles with the dispersed catalyst particles, the liquid can be removed (e.g., by evaporation) leaving the supported catalyst particles incorporated in and/or on the support particles. The liquid, which can be used to promote infiltration and/or adhesion of the catalyst particles to the support particles, may be substantially removed by heating the catalyst particle-support particle-liquid mixture at a temperature higher than the boiling point of the liquid and/or by reducing the pressure of the atmosphere surrounding the mixture. Any suitable liquid can be used to form a dispersion of the catalyst particles, including, but not limited to water, alcohols and mixtures thereof.

It will be appreciated that supported catalyst particles can be formed by forming a dispersion of the support particles and combining the dispersed support particles with catalyst particles.

In yet a further method, catalyst particles can be formed in situ in and/or on the support particles via the decomposition (e.g., thermal decomposition) of at least one suitable catalyst precursor compound. Supported catalyst particles can be formed by combining a catalyst precursor with already-formed support particles or, as disclosed above, with a precursor used to form the support particles (e.g., a polymer resin) and then by thermally treating the mixture to form catalyst particles that are incorporated in and/or on the support particles.

The mixing of support particles with at least one catalyst precursor can be performed at about ambient temperature or at elevated temperatures, e.g., through reflux. The thermal treatment used to decompose the catalyst precursor(s) can be carried out in various atmospheres. For instance, a mixture comprising the support particles and at least one catalyst precursor can be heated in an inert, reducing or oxidizing atmosphere to form the catalyst particles.

An inert atmosphere suitable for thermally decomposing a catalyst precursor compound can comprise, for example, helium, argon, or mixtures thereof. A reducing atmosphere can comprise hydrogen, nitrogen or mixtures thereof. An oxidizing atmosphere can comprise oxygen (e.g., air).

In embodiments where catalyst particles are formed from thermal decomposition of a catalyst precursor, preferably the catalyst precursor is heated to a temperature equal to or greater than its decomposition temperature. The preferred temperature will depend on the particular ligands used. The decomposition temperature of the catalyst precursor is the temperature at which the ligands substantially dissociate (or volatilize) from the metal atoms. During this process the bonds between the ligands and the metal atoms are broken such that the ligands are vaporized or otherwise separated from the metal. Preferably all of the ligands decompose. However, catalyst particles made using a catalyst precursor may contain carbon obtained from partial decomposition of the organic or inorganic components present in the catalyst precursor and/or solvent used to form a catalyst precursor solution.

The catalyst precursor compounds preferably are high purity, non-toxic, and easy to handle and store (with long shelf lives). Desirable physical properties include solubility in solvent systems, compatibility with other precursors and volatility for low temperature processing.

The catalyst precursor compounds are preferably metal organic compounds, which have a central main group, transition, lanthanide, or actinide metal atom or atoms bonded to a bridging atom (e.g., N, O, P or S) that is in turn bonded to an organic radical. Such compounds may include metal alkoxides, β-diketonates, carboxylates, oxalates, citrates, metal hydrides, thiolates, amides, nitrates, carbonates, cyanates, sulfates, bromides, chlorides, and hydrates thereof. The catalyst precursor can also be a so-called organometallic compound, wherein a central metal atom is bonded to one or more carbon atoms of an organic group. Aspects of processing with these catalyst precursors are discussed below.

Metal alkoxides $M(OR)_n$ possess both good solubility and volatility and are readily applicable to MOD processing. Metal alkoxides react easily with the protons of a large variety of molecules. This allows easy chemical modification and thus control of stoichiometry by using, for example, organic hydroxy compounds such as alcohols, silanols ($R_3SiOH$), glycols $OH(CH_2)_nOH$, carboxylic and hydroxycarboxylic acids, hydroxyl surfactants, etc.

Metal β-diketonates $[M(RCOCHCOR')_n]_m$ are attractive catalyst precursors because of their volatility and high solubility. Their volatility is governed largely by the bulk of the R and R' groups as well as the nature of the metal, which will determine the degree of association, m, represented in the formula above. Acetylacetonates ($R=R'=CH_3$) are advantageous because they can provide good yields.

Metal β-diketonates are prone to a chelating behavior that can lead to a decrease in the nuclearity of these precursors. These ligands can act as surface capping reagents and polymerization inhibitors. Thus, small particles can be obtained after hydrolysis of $M(OR)_{n-x}(\beta\text{-diketonate})_x$. Acetylacetone can, for instance, stabilize nanoscale colloids. Thus, metal β-diketonate precursors are preferred for preparing nanoscale catalyst particles.

Metal carboxylates such as acetates ($M(O_2CMe)_n$) are commercially available as hydrates, which can be rendered anhydrous by heating with acetic anhydride or with 2 methoxyethanol. Many metal carboxylates generally have poor solubility in organic solvents and, because carboxylate ligands act mostly as bridging chelating ligands, readily form oligomers or polymers. However, 2 ethylhexanoates ($M(O_2CCHEt_nBu)_n$), which are the carboxylates with the smallest number of carbon atoms, are generally soluble in most organic solvents.

The use of multiple single-catalyst precursors has the advantage of flexibility in designing precursor rheology as well as catalyst stoichiometry. Hetero-metallic precursors, on the other hand, may offer access to metal systems whose single catalyst precursors have undesirable solubility, volatility or compatibility.

Mixed-metal (i.e., hetero-metallic) species can be obtained via Lewis acid-base reactions or substitution reactions by mixing alkoxides and/or other catalyst precursors such as acetates, β-diketonates or nitrates. The combination reactions are typically controlled by thermodynamics; however, the stoichiometry of the hetero-compound once isolated may not reflect the composition ratios in the mixture from which it was prepared. On the other hand, most metal alkoxides can be combined to produce hetero-metallic species that are often more soluble than the starting materials.

The solvent(s) used can be selected based on a number of criteria including high solubility for the catalyst precursor compound, chemical inertness to the catalyst precursor compounds, rheological compatibility with the deposition technique being used (e.g., the desired viscosity, wettability, solubility, and/or compatibility with other rheology adjusters), boiling point, vapor pressure, rate of vaporization and economic factors (e.g., cost, recoverability, toxicity, etc.).

Suitable solvents used include pentanes, hexanes, cyclohexanes, xylenes, water (e.g., di-ionized water), ethyl acetates, toluene, benzenes, tetrahydrofuran, acetone, carbon disulfide, dichlorobenzenes, nitrobenzenes, pyridine, methyl alcohol, ethyl alcohol, butyl alcohol, chloroform, mineral spirits and mixtures thereof.

According to a preferred method, the supported catalyst particles, once formed, are incorporated in at least one of tobacco cut filler, cigarette paper and a cigarette filter that are used to form a cigarette. By incorporating the supported catalyst particles into one or more components of a cigarette, the amount of carbon monoxide in mainstream smoke during smoking can be reduced.

As used herein, a catalyst is capable of affecting the rate of a chemical reaction, e.g., a catalyst can increase the rate of oxidation of carbon monoxide to carbon dioxide without participating as a reactant or product of the reaction. An oxidant is capable of oxidizing a reactant, e.g., by donating oxygen to the reactant, such that the oxidant itself is reduced. A reducing agent is capable of reducing a reactant, e.g., by receiving oxygen from the reactant, such that the reducing agent itself is oxidized.

While not wishing to be bound by any particular theory, it is believed that during smoking of a cigarette having incorporated therein supported catalyst particles, CO and/or NO can be catalyzed in the presence of oxygen to reduce the level of CO and/or NO in mainstream and/or sidestream smoke. It is also believed that subsequent to the catalytic reaction, the supported catalyst particles may oxidize CO in the absence of oxygen and/or reduce NO to decrease the level of CO and/or NO in the mainstream and/or sidestream smoke.

A preferred embodiment of a method of making a cigarette comprises incorporating supported catalyst particles in and/or on at least one of tobacco cut filler, a cigarette wrapper optionally comprising web-filler material and a cigarette filter comprising filter material; forming a tobacco column from the tobacco cut filler in a cigarette making machine; placing the cigarette wrapper around the tobacco column to form a tobacco rod of a cigarette; and optionally attaching the cigarette filter to the tobacco column using tipping paper.

The amount of the supported catalyst incorporated in a cigarette can be selected such that the amount of carbon monoxide and/or nitric oxide in mainstream smoke is reduced during smoking of a cigarette. A total preferred amount of catalyst per cigarette is an amount effective to convert at least some CO to $CO_2$ and/or convert at least some NO to $N_2$. A preferred amount of the catalyst per cigarette is from about 1 to 200 mg, from about 1 to 50 mg, or from about 50 to 100 mg.

Preferably, the supported catalyst particles are incorporated in tobacco cut filler, cigarette wrapper and/or a cigarette filter in an amount effective to reduce the concentration in mainstream smoke of carbon monoxide and/or nitric oxide by at least 5% (e.g., by at least 15%, 20%, 25%, 30%, 35%, 40%, 45%, 50%, 55%, 60%, 65%, 70%, 75%, 80%, 85%, 90% or 95%). In a most preferred embodiment, the catalysts particles are incorporated in one or more components of a cigarette in an amount effective to reduce the concentration of carbon monoxide and/or nitric oxide during smoking of the cigarette by at least 10% (e.g., at least 20, 30, 40 or 50%). Without wishing to be bound by theory, it is believed that the synergy between the catalyst particles and the support particles can provide an effective (e.g., low temperature) catalyst for carbon monoxide and nitric oxide.

"Smoking" of a cigarette means the heating or combustion of the cigarette to form smoke, which can be drawn through the cigarette. Generally, smoking of a cigarette involves lighting one end of the cigarette and, while the tobacco contained therein undergoes a combustion reaction, drawing smoke from the combustion through the mouth end of the cigarette. The cigarette may also be smoked by other means. For example, the cigarette may be smoked by heating a tobacco rod portion of a cigarette using electrical heater means as described in commonly-assigned U.S. Pat. Nos. 6,053,176; 5,934,289; 5,591,368 or 5,322,075 or by using heat from a combustible heat source such as described in commonly assigned U.S. Pat. No. 4,966,171.

The term "mainstream smoke" refers to the smoke issuing or drawn through the mouth end of a cigarette during smoking of a cigarette. The term "sidestream smoke" refers to smoke produced during static burning.

Several factors contribute to the formation of carbon monoxide and nitric oxide in mainstream tobacco smoke. In addition to the combustion of constituents in the tobacco, the temperature and the oxygen concentration in a cigarette during combustion can affect their formation. For example, the total amount of carbon monoxide formed during smoking comes from a combination of three main sources: thermal decomposition (about 30%), combustion (about 36%) and reduction of carbon dioxide with carbonized tobacco (at least 23%). Formation of carbon monoxide from thermal decomposition, which is largely controlled by chemical kinetics, starts at a temperature of about 180° C. and finishes at about 1050° C. Formation of carbon monoxide and carbon dioxide during combustion is controlled largely by the diffusion of oxygen to the surface ($k_a$) and via a surface reaction ($k_b$). At 250° C., $k_a$ and $k_b$ are about the same. At 400° C., the reaction becomes diffusion controlled. Finally, the reduction of carbon dioxide with carbonized tobacco or charcoal occurs at temperatures around 390° C. and above.

During combustion, nitric oxide is produced in mainstream smoke at a concentration of about 0.5 mg/cigarette. However, nitric oxide can be reduced by carbon monoxide according to the following reactions:

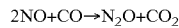
$$2NO+CO \rightarrow N_2O+CO_2$$

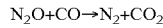
$$N_2O+CO \rightarrow N_2+CO_2$$

During smoking there are three distinct regions in a cigarette: the combustion zone, the pyrolysis/distillation zone, and the condensation/filtration zone. While not wishing to be bound by any particular theory, it is believed that the supported catalyst particles can target the various reactions that occur in different regions of the cigarette during smoking. The supported catalyst particles can convert CO to $CO_2$ and/or NO to $N_2$ in the presence or absence of an external source of oxygen.

First, the combustion zone is the burning zone of the cigarette produced during smoking of the cigarette, usually at the lit end of the cigarette. The temperature in the combustion zone ranges from about 700° C. to about 950° C., and the heating rate can be as high as 500° C./second. The concentration of oxygen is low in the combustion zone because oxygen is being consumed in the combustion of tobacco to produce carbon monoxide, carbon dioxide, nitric oxide, water vapor and other organic compounds. The low oxygen concentration coupled with the high temperature leads to the reduction of carbon dioxide to carbon monoxide by the carbonized tobacco. In the combustion zone, the supported catalyst particles can oxidize carbon monoxide (to form carbon dioxide) and/or reduce nitric oxide (to form nitrogen). The combustion zone is highly exothermic and the heat generated is carried to the pyrolysis/distillation zone.

The pyrolysis zone is the region behind the combustion zone, where the temperature ranges from about 200° C. to about 600° C. The pyrolysis zone is where most of the carbon monoxide is produced. The major reaction is the pyrolysis (i.e., the thermal degradation) of the tobacco that produces carbon monoxide, carbon dioxide, nitric oxide, charcoal and other smoke components using the heat generated in the combustion zone. There is some oxygen present in this region, and thus the supported catalyst particles may catalyze the oxidation of carbon monoxide to carbon dioxide and/or the reduction of nitric oxide to nitrogen. In the pyrolysis zone the supported catalyst particles can also directly oxidize CO and/or reduce NO.

In the condensation/filtration zone the temperature ranges from ambient to about 150° C. The major process in this zone is the condensation/filtration of the smoke components. Some amount of carbon monoxide, carbon dioxide, nitric oxide and nitrogen diffuse out of the cigarette and some oxygen (e.g., air) diffuses into the cigarette. The partial pressure of oxygen in the condensation/filtration zone does not generally recover to the atmospheric level. In the condensation/filtration zone, the supported catalyst particles can catalyze the conversion of carbon monoxide to carbon dioxide and/or nitric oxide to nitrogen.

During the smoking, mainstream smoke is drawn toward the mouth end of the cigarette. As carbon monoxide and nitric oxide travel within the cigarette, oxygen diffuses into and carbon monoxide and nitric oxide diffuse out of the cigarette through the wrapper. After a typical 2-second puff of a cigarette, CO and NO are concentrated in the periphery of the cigarette, i.e., near the cigarette wrapper, in front of the combustion zone. Due to diffusion of $O_2$ into the cigarette, the oxygen concentration is also high in the peripheral region. Airflow into the tobacco rod is greatest near the combustion zone at the periphery of the smoking article and is approximately commensurate with the gradient of temperature, i.e., higher airflow is associated with larger temperature gradients. In a typical cigarette, the highest temperature gradient is from the combustion zone (>850-900° C.) axially toward the mouth end of the cigarette. Within a few millimeters behind the combustion zone the temperature drops to near ambient. Further information on airflow patterns, the formation of constituents in cigarettes during smoking and smoke formation and delivery can be found in Richard R. Baker, "Mechanism of Smoke Formation and Delivery", Recent Advances in Tobacco Science, vol. 6, pp. 184-224, (1980) and Richard R. Baker, "Variation of the Gas Formation Regions within a Cigarette Combustion Coal during the Smoking Cycle", Beiträge zur Tabakforschung International, vol. 11, no. 1, pp. 1-17, (1981), the entire contents of both of which are incorporated herein by reference.

While direct placement of the supported catalyst particles in the tobacco cut filler is preferred, the supported catalyst particles may be placed in the cigarette filter, or incorporated in cigarette paper (wrapper). The supported catalyst particles can be placed both in the tobacco cut filler and in other locations. The quantity, location and distribution in a cigarette of the catalyst particles can be selected as a function of the temperature and airflow characteristics exhibited during smoking in order to adjust, e.g., increase or maximize the conversion rate of CO to $CO_2$ and/or NO to $N_2$. Furthermore, a catalyst composition can be selected that operates in a given temperature range, and a catalytically effective amount of the supported catalyst particles can be incorporated into a component of a cigarette (e.g., tobacco cut filler, wrapper and/or filter) to control the conversion efficiency.

The supported catalyst particles may be incorporated into at least one component in the form of a dry powder, paste or dispersion in a liquid. For example, catalyst particles in the form of a dry powder can be dusted on cut filler, cigarette paper material or filter material. A dispersion of catalyst material can be sprayed on the cut filler, cigarette wrapper or filter material (including filter paper material or cellulose acetate tow, by way of example).

The supported catalyst particles may be incorporated into the tobacco rod of a cigarette. Preferably the supported catalyst particles are provided continuously along the length of a tobacco rod, though the supported catalyst particles can be provided at discrete locations along the length of a tobacco rod. Furthermore, the supported catalyst particles may be homogeneously or non-homogeneously distributed along the length of a tobacco rod. The supported catalyst particles may be added to cut filler tobacco stock (e.g., loose cut filler) supplied to a cigarette-making machine or incorporated directly on a column of tobacco at the maker prior to the wrapping of a cigarette wrapper about the tobacco column to form a tobacco rod.

One embodiment provides a method for forming the supported catalyst particles and then depositing the supported catalyst particles on and/or incorporating them in tobacco cut filler, which is then used to form a cigarette. Any suitable tobacco mixture may be used for the cut filler. Examples of suitable types of tobacco materials include flue-cured, Burley, Bright, Maryland or Oriental tobaccos, the rare or specialty tobaccos, and blends thereof. The tobacco material can be provided in the form of tobacco lamina, processed tobacco materials such as volume expanded or puffed tobacco, processed tobacco stems such as cut-rolled or cut-puffed stems, reconstituted tobacco materials, or blends thereof. The tobacco can also include tobacco substitutes.

In cigarette manufacture, the tobacco is normally employed in the form of cut filler, i.e., in the form of shreds or strands cut into widths ranging from about $\frac{1}{10}$ inch to about $\frac{1}{20}$ inch or even $\frac{1}{40}$ inch. The lengths of the strands range from between about 0.25 inches to about 3.0 inches. The cigarettes may further comprise one or more flavorants or other additives (e.g., burn additives, combustion modifying agents, coloring agents, binders, etc.) known in the art.

In addition to or in lieu of incorporating the supported catalyst particles in the tobacco rod, the supported catalyst particles may be incorporated in cigarette wrapper before or after the cigarette wrapper is incorporated into a cigarette. The supported catalyst particles may be incorporated into the cellulosic web of the wrapper by depositing the supported catalyst particles directly on the cellulosic web and/or combined with web-filler material that is incorporated in the wrapper material.

The supported catalyst particles can be incorporated in cigarette paper by spraying or coating the particles onto a wet base (e.g., cellulosic) web, an intermediate web or a finished web. According to one method, supported catalyst particles in the form of a dry powder are physically admixed with the cigarette paper material during the paper manufacturing process.

The supported catalyst particles can be coated and/or printed on at least one surface of a paper wrapper (e.g., an interior and/or exterior surface) to form text or images on the cigarette wrapper. The amount of coating, printing and/or the amount of supported catalyst can be varied to adjust the amount of CO and/or NO reduction.

The supported catalyst particles can be incorporated into cigarette wrapping paper by incorporating the catalyst particles directly into the paper web and/or by incorporating the catalyst particles in web-filler material used in the production of the wrapping wrapper. The web-filler material can include an oxide, a carbonate, or a hydroxide of a Group II, Group III or Group IV metal, or the web-filler material can be selected from the group consisting of $CaCO_3$, $TiO_2$, $SiO_2$, $Al_2O_3$, $MgCO_3$, MgO and $Mg(OH)_2$.

In practice, the web-filler material serves as an agent for controlling the permeability of the wrapper (measured typically in units of Coresta, which is defined as the volume of air, measured in cubic centimeters, that passes through one square centimeter of material in one minute at a pressure drop of 1.0 kilopascals) and also can serve as a support for the supported catalyst particles.

A catalyst-modified web-filler comprises supported catalyst particles incorporated in and/or on particles of web-filler. In a preferred example, the web-filler material is $CaCO_3$ or other conventional filler material used in cigarette wrapper manufacture such as such as ALBACAR® 5970, which is calcium carbonate commercially available from Specialty Minerals of Bethlehem, Pa.

Aqueous slurry of the supported catalyst particles and the web-filler material can be incorporated into the head box of a paper-making machine and the mixture of supported catalyst particles and web filler material can be incorporated into cigarette paper during the paper-making process.

The supported catalyst particles and filler can be provided in any desired ratio, e.g., 10 to 90 wt. % supported catalyst and 90 to 10 wt. % web-filler material. In a preferred embodiment, the amount of web-filler material in the wrapper (both catalyst-modified web-filler and/or web-filler material without catalyst) can be from 3 to 50 wt. %.

A supported catalyst-modified web-filler can be used as all or part of the filler material in the wrapper-making processes or can be distributed directly onto the wrapper, such as by spraying or coating onto wet or dry base web. In production of a cigarette, the wrapper is wrapped around cut filler to form a tobacco rod portion of the smoking article by a cigarette-making machine, which has previously been supplied or is continuously supplied with tobacco cut filler and one or more ribbons of wrapper.

A cigarette wrapper can be any wrapping suitable for surrounding the cut filler, including wrappers containing flax, hemp, kenaf, esparto grass, rice straw, cellulose and so forth. Optional filler materials, flavor additives, and burning additives can be included in the cigarette wrapper. The wrapper can have more than one layer in cross-section, such as in a bi-layer wrapper as disclosed in commonly-owned U.S. Pat. No. 5,143,098, the entire content of which is herein incorporated by reference.

The supported catalyst particles are capable of converting CO to $CO_2$ and NO to $N_2$ at near-ambient temperatures, and therefore can be incorporated in the filter element of a cigarette. The filter may be a mono filter, a dual filter, a triple filter, a single- or multiple-cavity filter, a recessed filter or a free-flow filter. The supported catalyst particles can be incorporated into one or more filter parts selected from the group consisting of a shaped wrapper insert, a plug, a space between plugs, cigarette filter wrapper, plug wrap, a cellulose acetate sleeve, a polypropylene sleeve, and a free-flow sleeve. Optionally, cigarette filters can further comprise additives such as flavorants or adsorbents.

Supported catalyst particles can be incorporated in the wrapper of a cigarette wherein the wrapper comprises a first wrapper and a second outermost wrapper. Preferably, the supported catalyst particles are incorporated in the first inner wrapper. The total amount of supported catalyst in the second outer wrapper is preferably less than 50 mg for a given single cigarette, more preferably the second outer wrapper does not include the supported catalyst particles so as to provide a cigarette whose appearance is not affected by coloration from the supported catalyst particles.

In exemplary embodiments, a total amount of supported catalyst particles in a cigarette wrapper is from about 1 to 200 mg, preferably at least 50 mg per cigarette.

Supported catalyst particles will preferably be distributed throughout the tobacco rod, cigarette filter material and/or the cigarette wrapper portions of a cigarette. By providing the supported catalyst throughout one or more components of a cigarette it is possible to reduce the amount of carbon monoxide drawn through the cigarette, particularly at the combustion, pyrolysis, condensation and/or filter regions.

A further embodiment provides a method of making a cigarette comprising the supported catalyst particles. Techniques for cigarette manufacture are known in the art. Any conventional or modified cigarette making technique may be used to incorporate the catalyst particles. The resulting cigarettes can be manufactured to any known specifications using standard or modified cigarette making techniques and equipment. The cut filler composition is optionally combined with other cigarette additives, and provided to a cigarette-making machine to produce a tobacco column, which is then wrapped in a cigarette wrapper, and optionally tipped with filters.

Cigarettes may range from about 50 mm to about 120 mm in length. The circumference is from about 15 mm to about 30 mm in circumference, and preferably around 25 mm. The tobacco packing density is typically between the range of about 100 mg/cm$^3$ to about 300 mg/cm$^3$, and preferably 150 mg/cm$^3$ to about 275 mg/cm$^3$.

The activity of selected supported catalyst particles can be evaluated using a continuous flow packed bed reactor. The reactor comprises a quartz tube positioned within a programmable tube furnace. A test sample comprising supported catalyst particles can be placed inside the quartz tube, which is positioned within the furnace. Thermocouples are used to monitor the temperature of the furnace and of the supported catalyst particles within the reactor. To evaluate the ability of the supported catalyst particles to reduce the concentration of carbon monoxide and/or nitric oxide, a known mass of the catalyst particles can be dusted onto quartz wool and placed in the middle of the reactor. For the reactor data reported herein, the mass of the catalyst particles is about 50 mg. A filter pad can be used to prevent particulate material from entering a gas analyzer, which is located at a downstream side of the reactor. An input reactant gas mixture is introduced at an upstream side of the reactor and is passed through the quartz tube and over the catalyst particles at approximately atmospheric pressure at a total gas flow rate of about 1000 ml/min.

An input gas mixture is used to measure the oxidation of CO in the presence of an external source of oxygen. The test input gas mixture consists essentially of about 3.5% CO and 21% $O_2$ (balance He).

After attaining a steady state flow of gas, the temperature of the furnace is increased at a heating rate of about 15° C./min. and the gas that passes over the particles and emerges from the downstream side of the reactor is analyzed by a quadrupole mass spectrometer coupled to a data acquisition system. The NLT2000 multi-gas analyzer measures the concentration of CO, $CO_2$, NO and $O_2$ in the gas.

Data from the multi-gas analyzer was plotted as a function of furnace temperature. The data include the temperature at which about 5% of the carbon monoxide is converted to carbon dioxide ($T_5$), the temperature at which about 50% of the carbon monoxide is converted to carbon dioxide ($T_{50}$) and the temperature at which full conversion was obtained ($T_{100}$).

The supported catalyst particles comprise metallic cobalt particles incorporated in commercially available graphite nanotubes. In a first experimental run, the supported catalyst particles can convert 5% of the CO in the test gas stream to $CO_2$ at a temperature of about 195° C. and can convert 50% of the CO at a temperature of about 210° C. Nearly 100% conversion of CO is obtained at a sample temperature of about 220° C. In a subsequent experimental run of the same sample, $T_5$ was found to be about 140° C., $T_{50}$ was about 155° C., and $T_{100}$ was about 160° C. Improvement in the catalytic activity of the sample from the first run to the second run can be attributed to removal of residual moisture from exposed surfaces of the catalyst and/or support particles.

The supported catalyst particles may be used in a variety of applications. For example, the catalyst particles may be incorporated into one or more components of a cigarette (e.g., tobacco cut filler, cigarette paper and/or cigarette filters) such that during smoking of the cigarette the concentration of carbon monoxide and/or nitric oxide in mainstream and/or sidestream smoke is reduced.

Referring to FIG. 1, a preferred embodiment of a cigarette 100 has a tobacco rod portion 90 and filtering tip 92. Optionally, embodiments of the cigarette 100 can be practiced without a filtering tip 92. Typically, the tobacco rod portion 90 comprises a column of tobacco 102 (e.g., tobacco cut filler). According to an embodiment, as shown in expanded view in FIG. 1, supported catalyst particles 108 can be supported on the tobacco cut filler 102.

Figure 2:
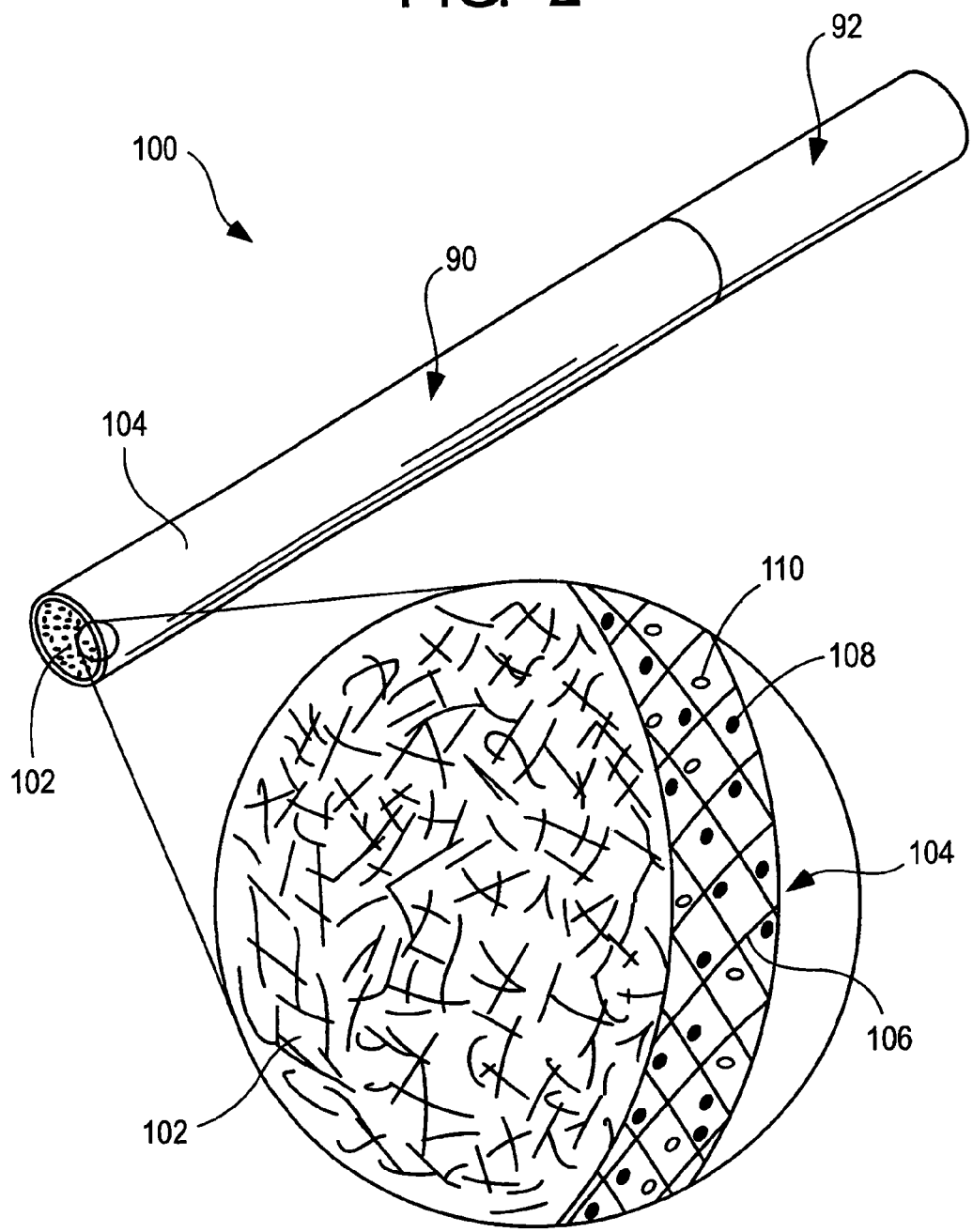
FIG. 2 shows an exemplary smoking article having supported catalyst particles supported on the web of a wrapper with a magnified view of the wrapper.

Preferably the tobacco rod 90 is enwrapped with a cigarette (tobacco) wrapper 104. As shown in expanded view in FIG. 2, the wrapper 104 includes a web of fibrous cellulosic material 106 in which is optionally dispersed particles of web-filler material 110, such as calcium carbonate ($CaCO_3$). According to a further embodiment, supported catalyst particles 108 can be supported on the fibrous web 106. In a still further embodiment, the supported catalyst particles can be supported on filter material (not shown) comprising filtering tip 92.

The catalyst particles may be incorporated into a hydrocarbon conversion reactor in an amount effective to convert hydrocarbons. The catalyst particles may be incorporated into a vehicle exhaust emissions system in an amount effective to oxidize carbon monoxide to carbon dioxide. The catalyst particles may also be used for emissions reduction in the cold starting of an automobile engine in an amount effective to oxidize carbon monoxide to carbon dioxide. In another embodiment, the catalyst particles may be incorporated into a laser in an amount effective to oxidize carbon monoxide to carbon dioxide. In another embodiment, the catalyst particles can be incorporated into a fuel cell in an amount effective to oxidize carbon monoxide to carbon dioxide. In yet another embodiment, the catalyst particles can be used in an air filter for the conversion of carbon monoxide and/or indoor volatile organic compounds.

While the invention has been described with reference to preferred embodiments, it is to be understood that variations and modifications may be resorted to as will be apparent to those skilled in the art. Such variations and modifications are to be considered within the purview and scope of the invention as defined by the claims appended hereto.

All of the above-mentioned references are herein incorporated by reference in their entirety to the same extent as if each individual reference was specifically and individually indicated to be incorporated herein by reference in its entirety.

What is claimed is:

1. A component of a cigarette comprising catalyst particles supported in and/or on electrically conductive support particles of a partially reduced oxide of a transition metal comprising a Magnéli phase selected from the group consisting of titanium, vanadium, zirconium, niobium, molybdenum, and mixtures thereof, wherein said support particles during the smoking of a cigarette act in synergy with said catalyst particles for the catalytic combustion of carbon monoxide created during smoking.

2. The component of a cigarette of claim 1, wherein (a) said catalyst particles comprise nanoscale particles and/or said support particles comprise nanoscale particles; (b) said catalyst particles comprise a transition metal or an oxide of a transition metal; or (c) said catalyst particles comprise a noble metal or an oxide of a noble metal.

3. The component of a cigarette of claim 1, wherein the said partially reduced oxide of a transition metal comprising a Magnéli phase further comprises a dopant that is different than the transition metal.

4. The component of a cigarette of claim 3, wherein the dopant is selected from the group consisting of titanium, vanadium, zirconium, niobium, molybdenum, and mixtures thereof.

5. The component of a cigarette of claim 1, wherein the said component is selected from the group consisting of tobacco cut filler, cigarette paper and cigarette filter material.

6. The component of a cigarette of claim 1, wherein the supported catalyst particles are iron oxide particles.

7. A cigarette comprising a tobacco rod, cigarette paper and an optional filter, wherein at least one of the tobacco rod, cigarette paper and optional filter comprises supported catalyst particles capable of converting carbon monoxide to carbon dioxide, wherein the supported catalyst particles comprise catalyst particles supported in and/or on electrically conductive support particles of a partially reduced oxide of a transition metal comprising a Magnéli phase selected from the group consisting of titanium, vanadium, zirconium, niobium, molybdenum, and mixtures thereof, wherein said support particles during the smoking said cigarette act in synergy with said catalyst particles for the catalytic combustion of carbon monoxide created during the smoking experience.

8. The cigarette of claim 7, wherein the catalyst particles additionally are capable of acting as a catalyst for the conversion of nitric oxide to nitrogen.

9. The cigarette of claim 7, wherein the catalyst particles are incorporated in the tobacco rod, cigarette paper and/or filter in an amount effective to convert at least 5% of carbon monoxide in mainstream tobacco smoke to carbon dioxide.

10. The cigarette of claim 7, wherein the catalyst particles are incorporated along the length of the tobacco rod, or the cigarette wrapper comprises a web-filler material and the supported catalyst particles are supported on the web-filler material.

11. The cigarette of claim 7, wherein the wrapper is a first wrapper and the cigarette further comprises a second wrapper radially outward from the first wrapper and/or the tobacco rod further comprises paper filler and the supported catalyst particles are supported in and/or on the paper filler.

12. The cigarette of claim 7, wherein the supported catalyst particles are incorporated in an amount effective to additionally reduce the concentration in mainstream smoke of at least one polyaromatic hydrocarbon.

* * * * *

UNITED STATES PATENT AND TRADEMARK OFFICE
CERTIFICATE OF CORRECTION

PATENT NO. : 8,118,035 B2
APPLICATION NO. : 11/636589
DATED : February 21, 2012
INVENTOR(S) : Donald E. Miser et al.

It is certified that error appears in the above-identified patent and that said Letters Patent is hereby corrected as shown below:

On the title page, the title should read --SUPPORTED CATALYST FOR THE COMBUSTION OF CARBON MONOXIDE FORMED DURING SMOKING--.

Signed and Sealed this
Fourteenth Day of May, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,118,035 B2
APPLICATION NO. : 11/636589
DATED : February 21, 2012
INVENTOR(S) : Donald E. Miser et al.

It is certified that error appears in the above-identified patent and that said Letters Patent is hereby corrected as shown below:

Title Page, Item (54) and in the Specification, at Column 1, lines 1-3, the title should read
--SUPPORTED CATALYST FOR THE COMBUSTION OF CARBON MONOXIDE FORMED DURING SMOKING--.

This certificate supersedes the Certificate of Correction issued May 14, 2013.

Signed and Sealed this
Eleventh Day of June, 2013

Teresa Stanek Rea
*Acting Director of the United States Patent and Trademark Office*